United States Patent
Giffin, III et al.

[11] Patent Number: 5,820,345
[45] Date of Patent: Oct. 13, 1998

[54] SPLIT ROTOR SHAFT DRIVEN LIFT FAN

[75] Inventors: Rollin G. Giffin, III, Cincinnati; Lawrence W. Dunbar, Loveland; Ronald F. Petsch, West Chester, all of Ohio

[73] Assignee: General Electric Company, Cincinnati, Ohio

[21] Appl. No.: 772,672

[22] Filed: Dec. 20, 1996

[51] Int. Cl.⁶ ............................................. F04D 29/26
[52] U.S. Cl. ........................ 416/128; 416/129; 416/115
[58] Field of Search ................................. 416/129, 128, 416/115, DIG. 2

[56] References Cited

U.S. PATENT DOCUMENTS

| | | | |
|---|---|---|---|
| 1,719,225 | 7/1929 | Hallander | 416/128 |
| 2,730,311 | 1/1956 | Doak. | |
| 2,835,332 | 5/1958 | Fry | 416/128 |
| 3,044,260 | 7/1962 | Hamilton. | |
| 3,370,541 | 2/1968 | Parsons. | |
| 4,074,652 | 2/1978 | Jackson. | |
| 5,035,377 | 7/1991 | Buchelt | 416/DIG. 2 |
| 5,226,350 | 7/1993 | Cycon et al.. | |
| 5,351,913 | 10/1994 | Cycon et al.. | |
| 5,405,104 | 4/1995 | Pande | 416/128 |

*Primary Examiner*—John T. Kwon
*Attorney, Agent, or Firm*—Andrew C. Hess; Patrick R. Scanlon

[57] ABSTRACT

A split fan for providing lift for an aircraft is described. In one embodiment, a main engine shaft extends to the split fan, and a portion of the split fan is located at an elevation above the main engine shaft and a portion of the split fan is located at an elevation below the main engine shaft. In the one embodiment, the split fan includes an outer casing configured to be mounted to a fuselage of the aircraft, a first stage rotor including a shaft, a gear secured to the shaft, and a plurality of rotor blades radially extending from the shaft. The split fan also includes a second stage rotor including a shaft, a gear secured to the shaft, and a plurality of blades radially extending from the shaft. A drive shaft having a first end and a second end is coupled at the drive shaft first end to the main engine shaft. A drive gear is located at the second end of the drive shaft, and the first stage rotor gear and the second stage rotor gear are coupled to the drive gear so that as the drive gear rotates, the first stage rotor gear rotates in a first direction and the second stage rotor gear rotates in a second direction.

12 Claims, 4 Drawing Sheets

SPLIT ROTOR SHAFT DRIVEN LIFT FAN

FIELD OF THE INVENTION

This invention relates generally to gas turbine engines and more particularly, to a gas turbine engine including a split rotor shaft driven lift fan.

BACKGROUND OF THE INVENTION

Advanced aircraft systems require dry thrust augmentation for short take off (STO) and for vertical landing (VL). Using remote lift fan(s) powered by the main cruise engine for dry thrust augmentation and for providing the necessary aircraft control moments such as pitch, roll and yaw, is known. Two types of known lift fans are gas driven and shaft driven type fans.

Generally, for the gas driven lift fan (GDLF) system, a portion of the cruise engine mixed flow exhaust air is diverted to a drive turbine directly coupled to the lift fan. The drive turbine may be mounted to the tip of the lift fan or inside the hub region of the fan inner flowpath and is interconnected to the fan with a shaft. The remainder of the main engine exhaust is diverted downward through thrust (lift) producing nozzles. In some arrangements, cruise engine bypass air is employed for the lift producing nozzles and all the cruise engine hot exhaust flow is diverted to the lift fan turbines.

Generally, for the shaft driven lift fan (SDLF) system, the cruise engine low pressure turbine extracts an amount of power exceeding that required to drive the cruise engine fan. The excess power is used to drive a remote lift fan. Particularly, an extension of the low pressure shaft drives the lift fan through a clutch and gear arrangement. The cruise engine, during conventional modes of flight, generally has a mixed flow exhaust. During the STO and VL portions of the mission, the engine is converted to a separate flow mode of operation since the shaft power tap on the low pressure turbine drops its exit pressure and the normal mixed flow mode bypass-to-core pressure ratio can no longer be retained. The bypass flow and turbine exit flow are normally diverted downward, through separate thrust (lift) producing nozzles.

Known arrangements for lift fans include a single GDLF mounted in fuselage, a pair of GDLFs mounted in the wings, and a single SDLF mounted in fuselage. Of course, many alternative arrangements are possible depending on the aircraft mission requirements and the airframe. The pressure ratio/size requirements, which ultimately are determined by the lift fan augmentation ratio requirements for the lift fans, vary widely within the different scenarios of the missions/airframes. For example, in some scenarios, a fuselage mounted SDLF requires a lift fan pressure ratio that significantly exceeds 2. A prudent selection of the lift fan parameters includes two stages of compression to remain within the fan ratings. A logical location for the shaft from the main engine to penetrate into the hub of the SDLF is to cross the SDLF flowpath downstream of the turbomachinery. The gearing can be readily located in the hub region and the interference by the shaft with the flow through the SDLF is minimized. An alternate configuration is to locate the shaft forward of the turbomachinery.

With both penetration locations, however, the forward or aft portion of the fan protrudes above or below the fuselage unless the shaft from the main engine is angled or a second gear set is used. It would be desirable, however, to provide that the fan does not protrude from the fuselage, and that the main engine shaft need not be angled and that no second gear set is required to drive the lift fan.

SUMMARY OF THE INVENTION

These and other objects and advantages may be provided by a split fan with the shaft penetrating the fan between the two fan stages. More particularly, the split fan includes two stages, i.e., stage one and stage two. Stage one and stage two are on independent shafts that are driven on opposite sides of a gear coupled to the main engine shaft through a clutch. A portion of the SDLF extends above the main engine shaft and a portion of the SDLF extends below the main engine shaft. Since the main fan shaft is approximately centered within the fuselage, the split fan configuration minimizes the tendency for the protrusion of the SDLF above or below the mold line. Further, with opposite rotations of the two stage lift fan, the gyroscopic torques transmitted to the aircraft are minimized since such torques are opposite in direction for the two shafts and are therefore cancelled internal to the SDLF system.

In addition, the split fan configuration provides that the gear tooth load is reduced to approximately one-half of the load for a single shaft configuration. That is, with the present split fan configuration, one half the input power goes to each of the two rotors. Since the rotors rotate at equal rotational speeds, the torque on each rotor in the present split fan configuration is about one half the torque on a single shaft. By reducing the tooth load, the gear weights can be significantly reduced since such gears are not subject to as much stresses as in a single shaft fan.

DETAILED DESCRIPTION OF THE DRAWINGS

Figure 1:
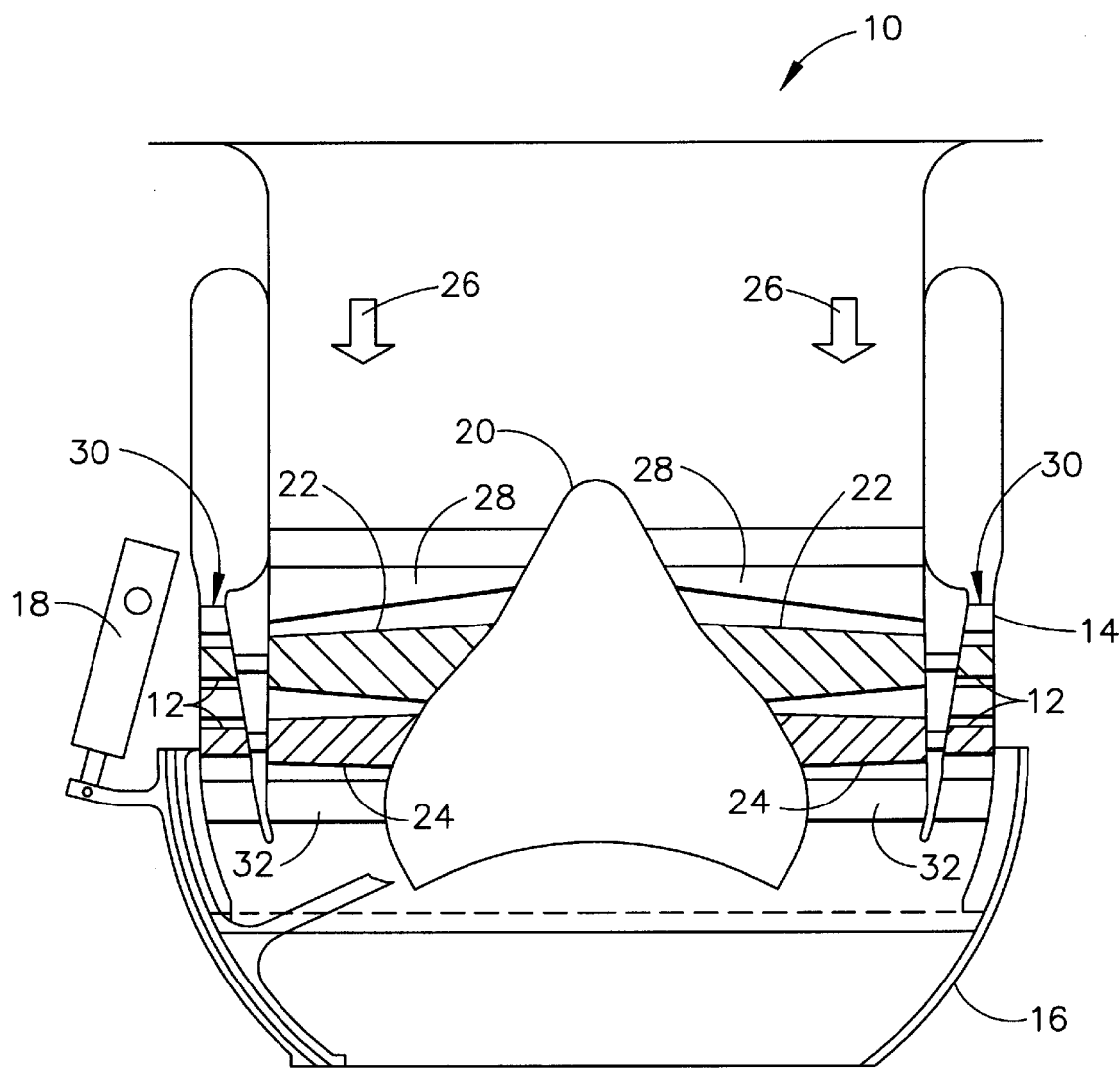
FIG. 1 is a schematic illustration of a known counter-rotating two stage GDLF driven by tip turbines.

FIG. 1 is a schematic illustration of a known counter-rotating two stage gas driven lift fan (GDLF) 10 driven by tip turbines 12. In general, GDLF 10 includes an outer case 14, and a nozzle 16 rotatable relative to outer case 14 under the control of a hydraulic control 18. Lift fan 10 also includes a hub 20 within case 14 and first and second stage rotor blades 22 and 24 extend from hub 20 in an air flow path 26. Inlet guide vanes 28 are located upstream of blades 22 and 24. Stators 32 also are located in air flow path 26 downstream of second stage rotor blades 24. Fan 10 further includes a hot gas channel 30 in flow communication with tip turbines 12. Tip turbines 12 are coupled to rotor blades 22 and 24.

In GDLF 10, a portion of the cruise engine mixed flow exhaust air is diverted through channel 30 to drive tip turbines 12. The remainder of the main engine exhaust is diverted downward through the main engine nozzle. Lift fans, such as fan 10, are well known.

Figure 2:
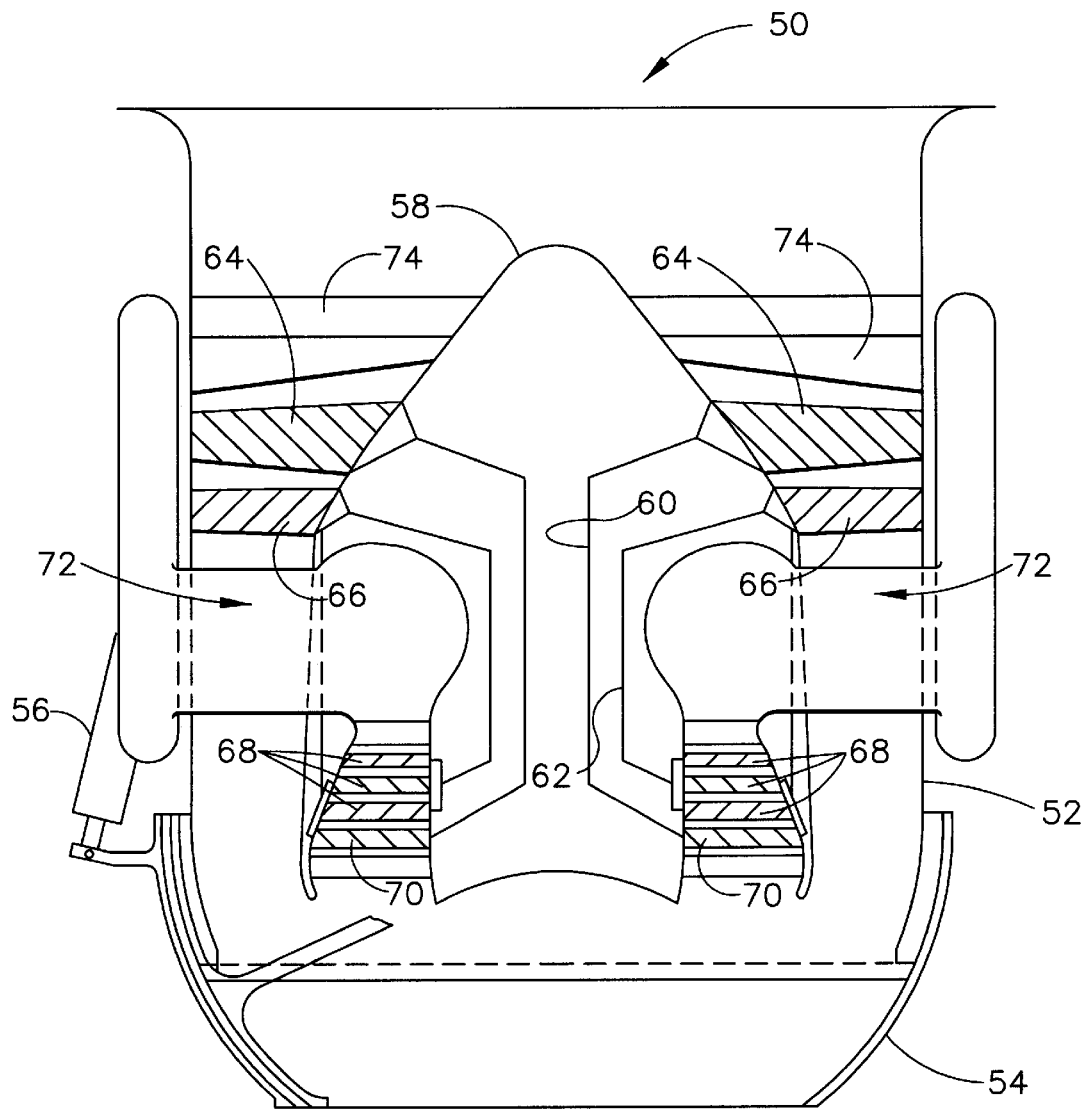
FIG. 2 is a schematic illustration of a known counter-rotating two stage GDLF driven by hub turbines.

FIG. 2 is a schematic illustration of another known type of gas driven lift fan 50. Particularly, lift fan 50 is a counter-rotating two stage gas driven lift fan (GDLF) driven by hub turbines as described below. In general, GDLF 50 includes an outer case 52, and a nozzle 54 rotatable relative to case 52 under the control of hydraulic control 56.

Lift fan 50 also includes a hub 58 within case 52, and a first shaft 60 and a second shaft 62 extend within hub 58.

Stage one rotor blades 64 are coupled to one end of first shaft 60, and stage two rotor blades 66 are coupled to one end of second shaft 62. In addition, stage three rotor blades 68 are coupled to the other end of second shaft 62, and stage four rotor blades 70 are coupled to the other end of first shaft 60. A hot gas channel 72 is in flow communication with hub turbines 68 and 70. Inlet guide vanes 74 also are located within case 52 upstream of stage one rotor blades 64.

In GDLF 50, a portion of the cruise engine mixed flow exhaust air is diverted through channel 72 to drive hub turbines 68 and 70. The remainder of the main engine exhaust is diverted downward through the main engine nozzle. Lift fans, such as fan 50, are well known.

Figure 3:
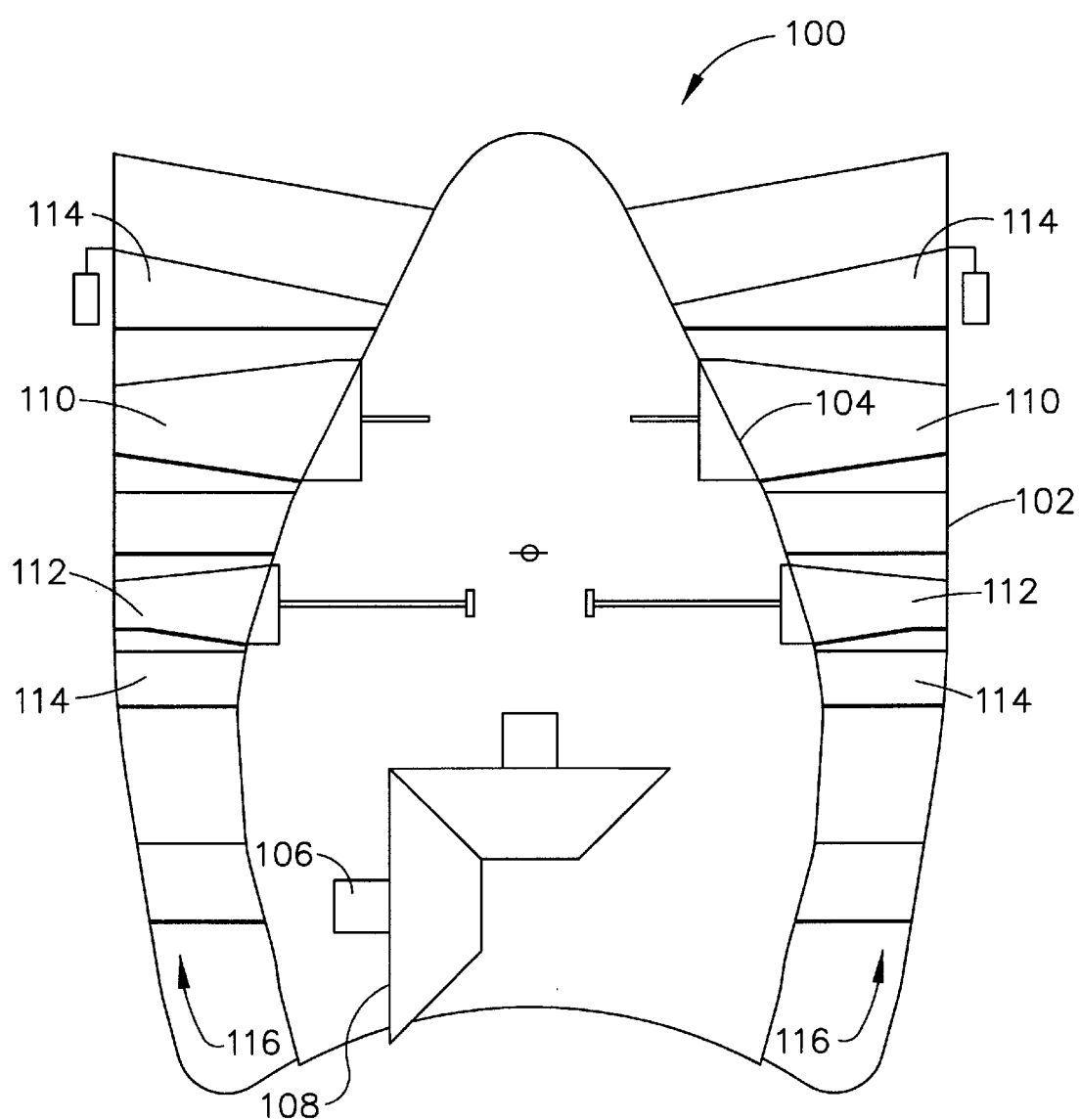
FIG. 3 is a schematic illustration of a known co-rotating two stage SDLF.

FIG. 3 is a schematic illustration of yet another known type of lift fan 100. Particularly, fan 100 is a co-rotating two stage shaft driven lift fan (SDLF). Fan 100 includes an outer case 102. A hub 104 is located within case 102. Case 102 is penetrated by a main engine shaft 106. A gear assembly 108 within hub 104 is engaged to main engine shaft 106. First and second rotor stage blades 110 and 112 are secured to hub 104, and stator blades 114 are secured to case 102 in air flow path 116.

Generally, for SDLF 100, the cruise engine low pressure turbine extracts an amount of power exceeding that required to drive the cruise engine fan. The excess power is used to drive remote fan 100. Particularly, an extension of the low pressure shaft 106 drives lift fan 100 through gear assembly 108.

With the penetration locations in known fan 100, and as explained above, the forward or aft portion of such fans protrudes above or below the fuselage unless the shaft from the main engine is angled or a second gear set is used. Preferably, however, such fans would not protrude from the fuselage, the main engine shaft would not need to be angled, and no second gear set would be required to drive the lift fan.

Figure 4:
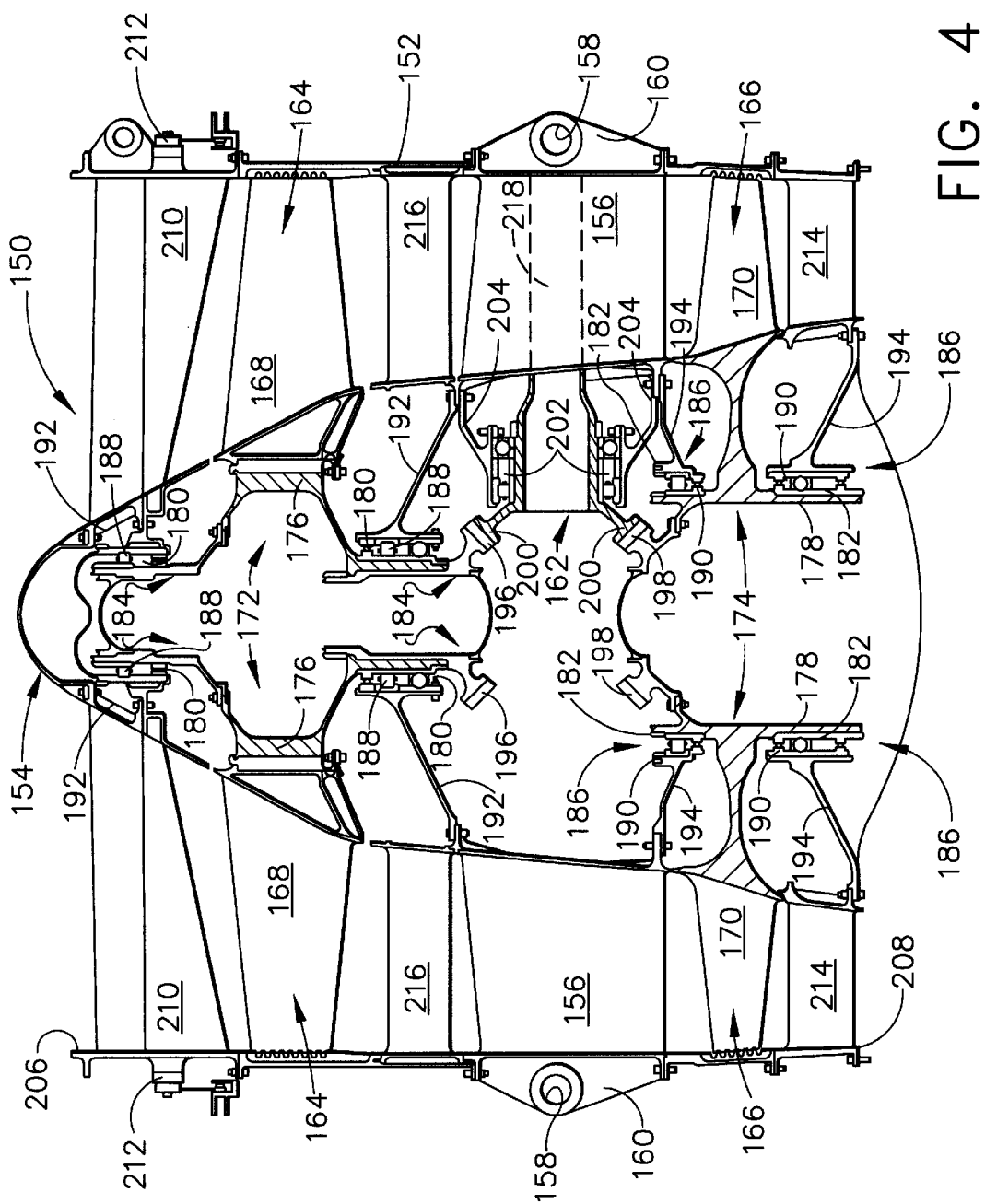
FIG. 4 is a schematic illustration of a split fan in accordance with one embodiment of the present invention.

FIG. 4 is a schematic illustration of a split fan 150 in accordance with one embodiment of the present invention and which overcomes the above described shortcomings of some known lift fans. More particularly, and in accordance with one embodiment, split fan 150 includes an outer casing 152, which is configured to be mounted to the fuselage of the aircraft, and a hub 154 within casing supported by support struts 156. Casing 152 is mounted to the fuselage by, for example, extending bolts (not shown) through bolt openings 158 in mounting flanges 160.

A main engine shaft 218 extends to hub 154 through strut 156 and drives a gear assembly 162. A portion of split fan 150 is located at an elevation above the main engine shaft and a portion of split fan 150 is located at an elevation below the main engine shaft. Main engine shaft penetrates fan 150 between first and second rotor stages 164 and 166, and the main shaft is approximately centered within the aircraft fuselage (not shown).

First stage rotor blades 168 and second stage rotor blades 170 are supported by first and second support assemblies 172 and 174. Such support assemblies 172 and 174 include shafts 176 and 178 which are supported on inner races 180 and 182 of bearings 184 and 186. Outer races 188 and 190 of bearings 184 and 186 are secured to stationary support elements 192 and 194. Support elements 192 and 194 are secured to hub 154 which, in turn, is supported by support struts 156. Hub 154 also is supported by inlet guide vanes 210 and stators 214.

First rotor stage 164 includes a first drive gear 196, and second rotor stage 166 includes a second drive gear 198. First and second rotor stage drive gears 196 and 198 are positioned approximately one-hundred and eighty degrees apart and engage gear 200 of gear assembly 162. Gear assembly 162 is supported by, and rotatable relative to, bearing assemblies 202 supported by support elements 204 As gear 200 rotates about its axis, first and second drive gears 196 and 198 also rotate. First gear 196 rotates in a first direction and second gear 198 rotates in a second direction. Of course, since first and second stage rotor blades 168 and 179 are driven by first and second drive gears 196 and 198, respectively, such counter rotation results in first and second stage rotor blades 168 and 179 rotating in opposite directions.

With respect to air flow, split fan 150 includes an inlet 206 and an outlet 208. Variable inlet guide vanes 210 are located upstream of rotor blades 168 at inlet 206, and the orientation of vanes 210 is controlled by controls 212. Stators 214 are located downstream of rotor blades 170 and are located at outlet 208. Intervening stators 216 are located between blades 168 and 170.

Split fan 150 minimizes the tendency for protrusion above or below the fuselage mold line. Further, with opposite rotation of stages 164 and 166, the gyroscopic torques transmitted to the aircraft are minimized since such torques are opposite in direction and are therefore cancelled within fan 150. Moreover, split fan 150 provides that the gear tooth load on gears 196 and 198 is reduced to approximately one-half of the load for a single shaft configuration. That is, with fan 150, one half the input power goes to each of rotor stages 164 and 166. Since rotor blades 168 and 170 rotate at equal rotational speeds, the torque on each rotor stage 164 and 166 is about one half the torque on a single shaft. In addition, by reducing the tooth load, the gear weights can be significantly reduced since gears 196 and 198 are not subject to as much stresses as in a single shaft fan.

The main reason for stators 216 is to turn the flow to axial and thereby reduce the flow Mach number to minimize the loss in total pressure (available energy) created by the relatively thick strut 156 that houses the main engine shaft. Intervening stators 216 between rotor blades 168 and 170 provide that rotor stages 164 and 166 are substantially independent, even though rotor stages 164 and 166 are counter rotating and fan 150 functions substantially the same as if rotor stages 164 and 166 were co-rotating on the same shaft. Of course, other alternative configurations also are possible.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A split fan for providing lift for aircraft, said split fan comprising:

an outer casing configured to be mounted to a fuselage of the aircraft;

a first stage rotor comprising a shaft, a gear secured to said shaft, and a plurality of rotor blades radially extending from said shaft;

a second stage rotor comprising a shaft, a gear secured to said shaft, and a plurality of blades radially extending from said shaft;

a drive shaft comprising a first end and a second end, said drive shaft first end configured to be coupled to a main engine shaft so that when said main engine shaft rotates, said drive shaft rotates;

a drive gear at said second end of said drive shaft, said first stage rotor gear and said second stage rotor gear coupled to said drive gear so that as said drive gear rotates, said first stage rotor gear rotates in a first direction and said second stage rotor gear rotates in a second direction.

2. A split fan in accordance with claim 1 wherein said first stage shaft and said second stage shaft are coupled to said drive gear approximately one hundred and eighty degrees apart.

3. A split fan in accordance with claim 1 further comprising a split fan inlet and at least one variable inlet guide vane located at said split fan inlet.

4. A split fan in accordance with claim 1 further comprising a stator located between said first stage rotor and said second stage rotor.

5. A split fan in accordance with claim 1 further comprising a split fan outlet and a stator located at said split fan outlet.

6. A split fan in accordance with claim 1 further comprising a support strut, and a plurality of support elements extending from said support strut.

7. A split fan in accordance with claim 6 further comprising a bearing at one end of at least one of said support elements, said bearing comprising an outer race and an inner race, one of said first stage and said second stage rotor shafts supported on said bearing outer race.

8. A split fan for providing lift for an aircraft, a main engine shaft extending to said split fan, a portion of said split fan located at an elevation above the main engine shaft and a portion of said split fan located at an elevation below the main engine shaft, said split fan comprising:

an outer casing configured to be mounted to a fuselage of the aircraft;

a first stage rotor comprising a shaft, a gear secured to said shaft, and a plurality of rotor blades radially extending from said shaft;

a second stage rotor comprising a shaft, a gear secured to said shaft, and a plurality of blades radially extending from said shaft;

a drive shaft comprising a first end and a second end, said drive shaft first end configured to couple to the main engine shaft so that when the main engine shaft rotates, said drive shaft rotates;

a drive gear at said second end of said drive shaft, said first stage rotor gear and said second stage rotor gear coupled to said drive gear so that as said drive gear rotates, said first stage rotor gear rotates in a first direction and said second stage rotor gear rotates in a second direction, said first stage shaft and said second stage shaft are coupled to said drive gear approximately one hundred and eighty degrees apart;

at least one support strut;

a plurality of support elements extending from said support strut; and a bearing at one end of at least one of said support elements, said bearing comprising an outer race and an inner race, one of said first stage and said second stage rotor shafts supported on said bearing outer race.

9. A split fan in accordance with claim 8 further comprising a split fan inlet and at least one variable inlet guide vane located at said split fan inlet.

10. A split fan in accordance with claim 8 further comprising a stator located between said first stage rotor and said second stage rotor.

11. A split fan in accordance with claim 8 further comprising a split fan outlet and a stator located at said split fan outlet.

12. A split fan in accordance with claim 8 further comprising a split fan inlet and a split fan outlet, at least one variable inlet guide vane located at said split fan inlet, a stator located between said first stage rotor and said second stage rotor, and a stator located at said split fan outlet.

\* \* \* \* \*